United States Patent
Nakamura

(10) Patent No.: US 9,541,916 B2
(45) Date of Patent: Jan. 10, 2017

(54) MOTOR CONTROL APPARATUS FOR CONTROLLING MOTOR

(71) Applicant: FANUC Corporation, Yamanashi (JP)

(72) Inventor: Tsutomu Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 78 days.

(21) Appl. No.: 14/699,499

(22) Filed: Apr. 29, 2015

(65) Prior Publication Data

US 2015/0362911 A1 Dec. 17, 2015

(30) Foreign Application Priority Data

Jun. 13, 2014 (JP) ................ 2014-122690

(51) Int. Cl.
*G05B 5/01* (2006.01)
*G05B 11/01* (2006.01)
*G05B 19/404* (2006.01)

(52) U.S. Cl.
CPC ... *G05B 19/404* (2013.01); *G05B 2219/37297* (2013.01); *G05B 2219/41085* (2013.01)

(58) Field of Classification Search
CPC ......... H02P 27/06; H02P 29/0241; H02P 3/14; H02P 3/18
USPC ...................................... 318/630
See application file for complete search history.

(56) References Cited

U.S. PATENT DOCUMENTS

2014/0139152 A1* 5/2014 Oyori .............. H02P 27/06
 318/376

FOREIGN PATENT DOCUMENTS

| CN | 1210777 A | 3/1999 |
| CN | 101256403 A | 9/2008 |
| CN | 103080859 A | 5/2013 |
| CN | 103154839 A | 6/2013 |
| CN | 103792955 A | 5/2014 |
| JP | 2004-234205 A | 8/2004 |
| JP | 2014-054001 A | 3/2014 |

* cited by examiner

*Primary Examiner* — Eduardo Colon Santana
*Assistant Examiner* — Devon Joseph
(74) *Attorney, Agent, or Firm* — Hauptman Ham, LLP

(57) ABSTRACT

A motor control apparatus includes a error calculation unit which calculates a error between a first position detection value of a movable part and a second position detection value of a driven part, a storage unit which stores the errors when the movable part engages with the driven part in a first and second drive direction, as a first initial error and a second initial error, respectively, and a compensation calculation unit which calculates the amount of compensation to correct backlash and an elastic deformation. The compensation calculation unit calculates a command error based on the first initial error and the second initial error and a predetermined constant which is larger than 0 and not greater than 1 and calculates the amount of compensation by subtracting the current error calculated by the error calculation unit from the command error.

2 Claims, 7 Drawing Sheets

MOTOR CONTROL APPARATUS FOR CONTROLLING MOTOR

RELATED APPLICATIONS

The present application claims priority to Japanese Application Number 2014-122690, filed Jun. 13, 2014, the disclosure of which is hereby incorporated by reference herein in its entirety.

BACKGROUND OF THE INVENTION

1. Technical Field

The present invention relates to a motor control apparatus for controlling a motor connected to a feed shaft of a machine tool or an industrial machine or an arm of an industrial robot.

2. Description of Related Art

A servo motor is connected to a shaft (mechanical movable part) such as a feed shaft of a machine tool or an industrial machine or an arm of an industrial robot. The rotation of the servo motor is converted to a linear motion of a table, etc., by means of a ball-screw, etc., or the transmission speed of the servo motor is reduced by a speed reducer.

There are cases where a stop position with respect to a certain position of the ball screw or the speed reducer in the positive direction is different from a stop position thereof in the negative direction. In general, this difference is referred to as a backlash which causes a reduction in the positional precision.

FIGS. 8A to 8C are explanatory views of backlash. FIG. 8A illustrates a movable part WA which is moved by a motor (not shown) and a driven part WB which is driven by the movable part WA. The movable part WA is provided, at both ends thereof, with projections A1, and A2, and the driven part WB is provided at its central portion, with a projection B. Therefore, when the movable part WA is moved, for example, in the right direction, the inner end of the projection A1 of the projections A1 and A2 of the movable part WA abuts against one end of the projection B of the driven part WB. As a result, the movable part WA and the driven part WB are moved together in the right direction.

Moreover, when the motor is reversed, the movable part WA is moved in the left direction from the right direction, as shown in FIG. 8B. Consequently, when the inner end of the other projection A2 of the movable part WA abuts against the other end of the projection B of the driven part WB, as shown in FIG. 8C, the movable part WA and the driven part WB are moved together in the left direction.

As may be understood from the foregoing, when the movement is reversed, it is necessary for the movable part WA to move by a predetermined displacement called backlash before the movable part WA abuts against the driven part WB. The backlash C shown in FIGS. 8A and 8C may be a cause of reduction of the positional precision. To prevent this, preparing an amount of compensation corresponding to the backlash C and adding the same to the position command of the motor have been practiced upon reversing the movement.

A semi-closed control device performs a position control of the driven part WB based on the position information of the motor without obtaining the position information of the driven part WB. In such a semi-closed control device, a corrected position command which is obtained by adding a backlash length to the movement command after reversing of the speed command is supplied to the motor, whereby the driven part WB is moved by the displacement corresponding to the movement command.

Moreover, in a device in which both the position information of the motor and the position information of the driven part WB can be obtained, i.e., in a full-closed control device, it is sufficient that a desired value is given as the movement command, because a sensor for the driven part WB is provided. In such a full-closed control device, when the speed command is reversed, the driven part WB begins moving after the motor is moved by a displacement corresponding to the backlash length, and accordingly, a delay in the movement occurs. Therefore, the full-closed control device may have a speed command correcting function to accelerate the motor after the speed command is reversed.

In the two types of control mentioned above, an appropriate compensation is made at an appropriate timing, wherein the amount of compensation and the compensation timing are determined in advance. Therefore, these two types of control both correspond to a feed-forward control.

In contrast thereto, in Japanese Unexamined Patent Publication (Kokai) No. 2014-054001, the position of the motor with backlash is obtained and an amount of compensation of backlash is determined based thereon. In this case, since the amount of compensation of backlash is determined based on the current position of the motor with backlash, the control disclosed in Japanese Unexamined Patent Publication (Kokai) No. 2014-054001 is a feed-back control. In Japanese Unexamined Patent Publication (Kokai) No. 2014-054001, a positional deviation between the movable part and the driven part when the movable part engages with the driven part is referred to as an initial deviation. The amount of compensation is calculated by subtracting the positional deviation between the current positions of the movable part and the driven part from the initial deviation.

In Japanese Unexamined Patent Publication (Kokai) No. 2014-054001, the backlash is interpreted to be merely a gap between tooth surfaces. However, in conventional machines, lost motion occurs due to an elastic deformation caused by a force acting between a movable part and a driven part, in addition to backlash defined merely as a gap. Furthermore, such an elastic deformation could include a linear deformation and a non-linear deformation.

If the lost motion includes an elastic deformation, when the initial deviation is obtained in Japanese Unexamined Patent Publication (Kokai) No. 2014-054001, the magnitude of the force applied to the backlash end and the magnitude of the force required when the motor is reversed differ from one another, and consequently, there is a possibility that the calculated amount of compensation is different from the required amount of compensation.

If the amount of compensation is too small, the workpiece tends to be insufficiently cut. Conversely, if the amount of compensation is excessively large, the workpiece tends to be cut excessively, thus resulting in the formation of over milled. In particular, when the amount of compensation is excessively large, the over milling on the cut surface of the workpiece appears to be a flaw, and consequently, it is highly likely that the workpiece will be judged to have failed to cut, which is often viewed as a problem.

The present invention has been completed in view of the foregoing, and it is an object of the present invention to provide a motor control apparatus which can prevent an excess amount of compensation from being formed, by taking elastic deformation into account.

SUMMARY OF THE INVENTION

In order to achieve the aforementioned object, according to the first aspect of the invention, there is provided a motor control apparatus having a movable part which is driven by a motor and a driven part which is driven by the movable part, comprising a first position detector which detects the position of the movable part, a second position detector which detects the position of the driven part, a deviation calculation unit which calculates a deviation between a first position detection value detected by the first position detector and a second position detection value detected by the second position detector, a storage unit which stores the deviations calculated by the deviation calculation unit when the movable part engages with the driven part in a first drive direction and in a second drive direction opposite to the first drive direction, as a first initial deviation and a second initial deviation, respectively, and a compensation calculation unit which calculates the amount of compensation to correct backlash between the movable part and the driven part and an elastic deformation caused by the engagement of the movable part with the driven part, wherein the compensation calculation unit calculates a command deviation based on the first initial deviation and the second initial deviation stored by the storage unit and a predetermined constant which is larger than 0 and not greater than 1 and calculates the amount of compensation by subtracting the current deviation calculated by the deviation calculation unit from the command deviation.

According to the second aspect of the invention, in the first aspect of the invention, when the drive direction after the reversing of the motor is the first drive direction, the command deviation is represented by (first initial deviation 33 constant+second initial deviation×(1−constant)), and when the drive direction after the reversing of the motor is the second drive direction, the command deviation is represented by (first initial deviation×(1−constant)+second initial deviation×constant).

According to the third aspect of the invention, in the second aspect of the invention, the constant is a value between 0.75 and 0.95.

The aforementioned object, features and effects and other objects, features and effects of the present invention will be made clearer from the detailed description of the representative embodiments of the present invention illustrated in the drawings.

DETAILED DESCRIPTION

Figure 1:
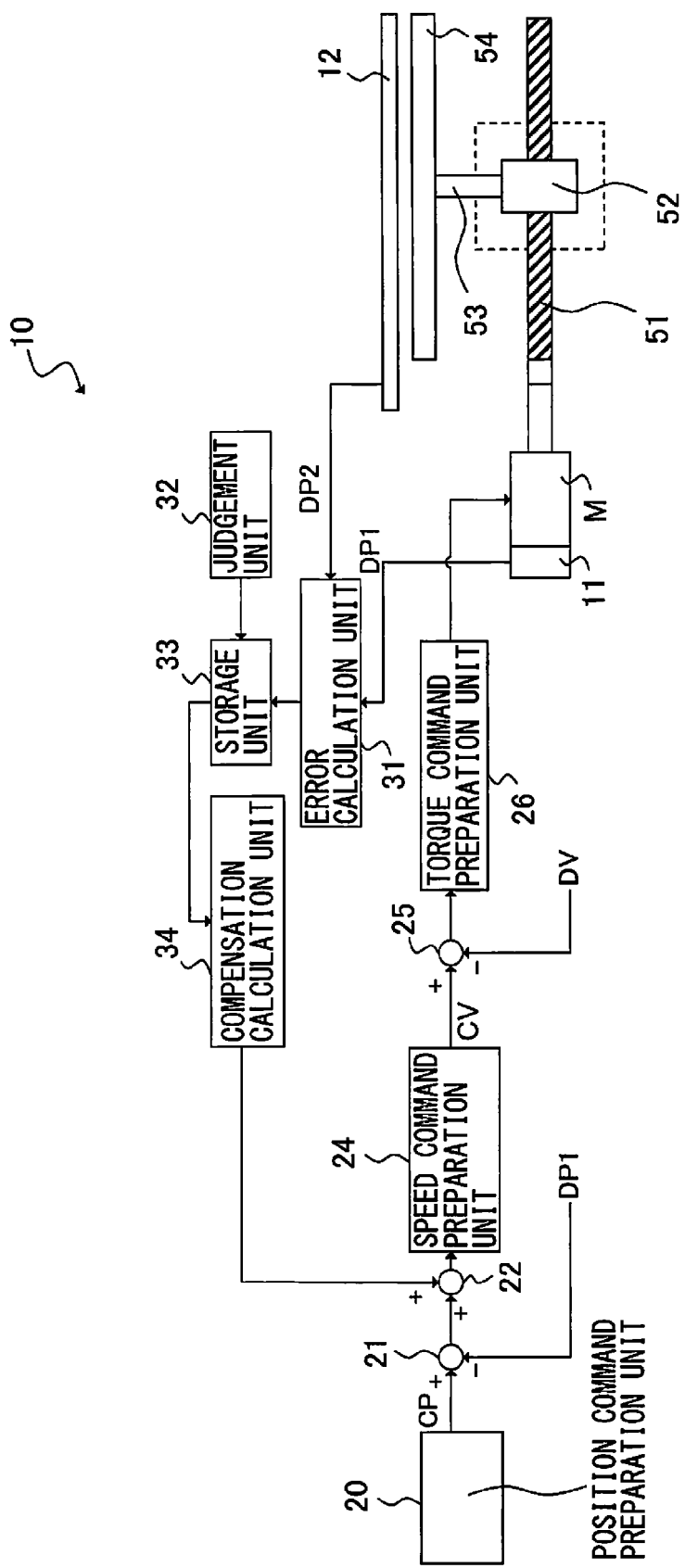
FIG. 1 is a block diagram of a motor control apparatus according to the present invention.

The embodiments of the present invention will be described below with reference to the accompanying drawings. In the drawings, corresponding components are assigned the same reference numerals. For the sake of clarity, the scale of the drawings may have been appropriately modified.

FIG. 1 is a function block diagram of the motor control apparatus according to the present invention. As can be seen in FIG. 1, a nut 52 engages with a screw 51 of a ball screw mechanism attached to an output shaft of the motor M. The nut 52 is connected to a table 54 through a coupling 53. The position of the motor M is detected by a first position detector, e.g., an encoder 11 attached to the motor M. The encoder 11 detects the speed detection value DV as well, based on a plurality of consecutive positions of the motor M. The position of the table 54 is detected by a second position detector, e.g., a scale 12, arranged in parallel with the table 54.

Figure 2:
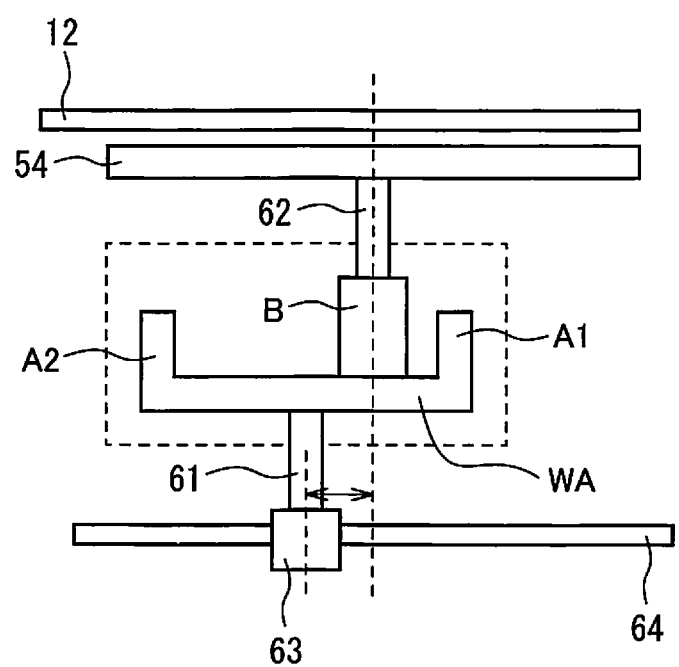
FIG. 2 is a schematic view of a ball screw mechanism shown in FIG. 1.

FIG. 2 schematically shows the ball screw mechanism. FIG. 2 mainly illustrates a movable part WA which is provided, on both ends thereof, with projections A1 and A2, and an engagement member B which slides between the projections A1 and A2 of the movable part WA. The lower surface of the movable part WA is connected to a motor position member 63 which indicates the position of the motor M through a first elastically deformable member 61. The engagement member B is connected to the table 54 through a second elastically deformable member 62.

Figure 3A:
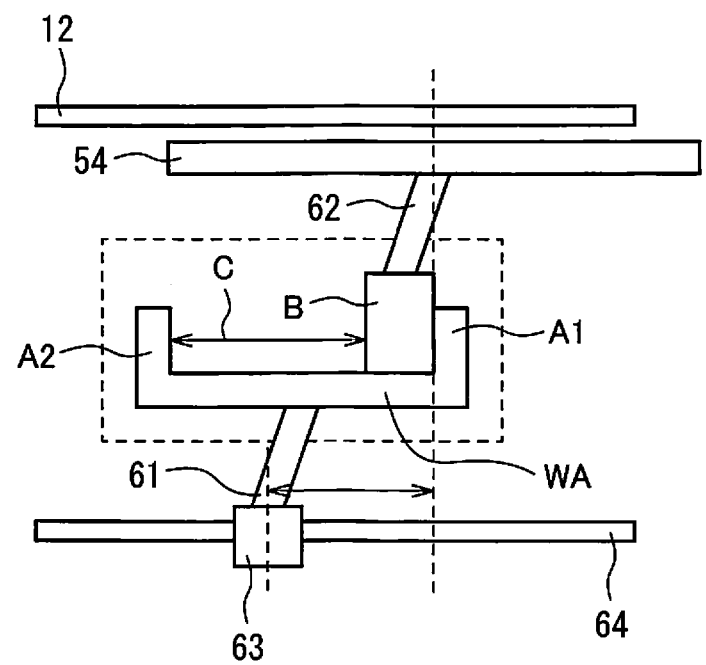
FIG. 3A is a partial schematic view when a movable part is moved in the left direction.
Figure 3B:
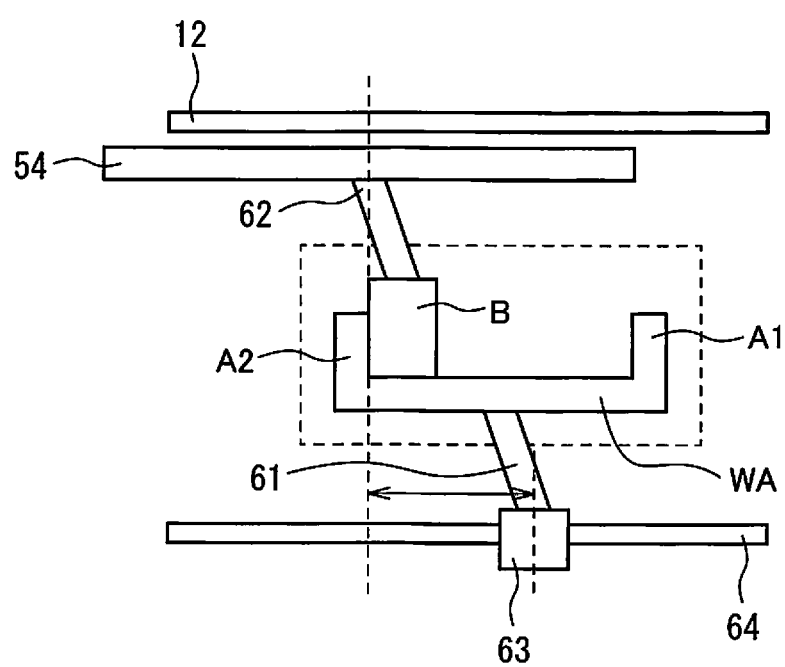
FIG. 3B is a partial schematic view when a movable part is moved in the right direction.

FIGS. 3A and 3B are schematic views of the movable part when it is moved in the left direction and in the right direction, respectively. When the motor position member 63 is moved in the left direction, the first elastically deformable member 61 is elastically deformed, so that the movable part WA is moved in the left direction with a slight delay with respect to the motor position member 63.

When the engagement member B engages with the projection A1 of the movable part WA, the engagement member B is moved together with the movable member WA. Further movement of the engagement member B in the left direction causes the second elastically deformable member 62 to elastically deform, so that the table 54 is moved in the left direction with a delay with respect to the engagement member B. It should be noted that, as can be seen in FIG. 3B, the same is substantially true when the motor position member 63 is moved in the right direction, and accordingly, no duplicate explanation is given hereinafter.

As shown in FIG. 3A, when the engagement member B engages with the projection A1 of the movable part WA, there is a backlash C between the engagement member B and the other projection A2 of the movable member WA. The amount of backlash C can be obtained by measuring the displacement of the movable part WA by means of a three-dimensional measuring device or the like and comparing the measured displacement with the displacement of the motor M, thereby measuring a difference therebetween. Alternatively, it is possible to obtain the amount of backlash C by measuring a so-called quadrant projection which is caused when the quadrant changes.

Here, as may be understood from the comparison of FIGS. 1 and 2, the first position detector (encoder) 11 and the motor M shown in FIG. 1 correspond to a linear actuator 64 which serves also as a linear detector in FIG. 2. Likewise, the screw 51 and the nut 52 in FIG. 1 correspond to the movable part WA, the driven part WB and the first elastically deformable member 61. The coupling 53 of FIG. 1 corresponds to the second elastically deformable member 62. In the following description, it is assumed that the ball screw mechanism shown in FIG. 1 is replaced with the ball screw mechanism schematically shown in FIG. 2.

With reference to FIG. 1, the motor control apparatus 10 according to the present invention is essentially composed of a position command preparation unit 20 which periodically prepares a position command CP of the movable part WA, a speed command preparation unit 24 which prepares a speed command of the movable part WA, and a torque command preparation unit 26 which prepares a torque command of the motor M.

The motor control apparatus 10 further includes a deviation calculation unit 31 which calculates a deviation ΔP between the first position detection value DP1 detected by the first position detector 11 and the second position detection value DP2 detected by the second position detector 12. Furthermore, the motor control apparatus 10 includes a judgment unit 32 which judges whether the projection A1 or the projection A2 of the movable part WA engages with the driven part WB when the movable part WA is moved from an optional initial position in the first drive direction and in the second drive direction opposite to the first drive direction.

The motor control apparatus 10 further includes a storage unit 33 which stores the deviation ΔP calculated by the deviation calculation unit 31 as an initial deviation in correlation with the first drive direction or the second drive direction when the judgment unit 32 judges that the movable part WA engages with the drive part WB. Note that, the storage unit 33 can store other data such as speed. Moreover, the motor control apparatus 10 includes a compensation calculation unit 34 which calculates the amount of compensation necessary to correct the backlash between the movable part WA and the driven part WB and the elastic deformations of the first elastically deformable member 61 and the second elastically deformable member 62 caused when the movable part WA engages with the drive part WB.

Figure 4:
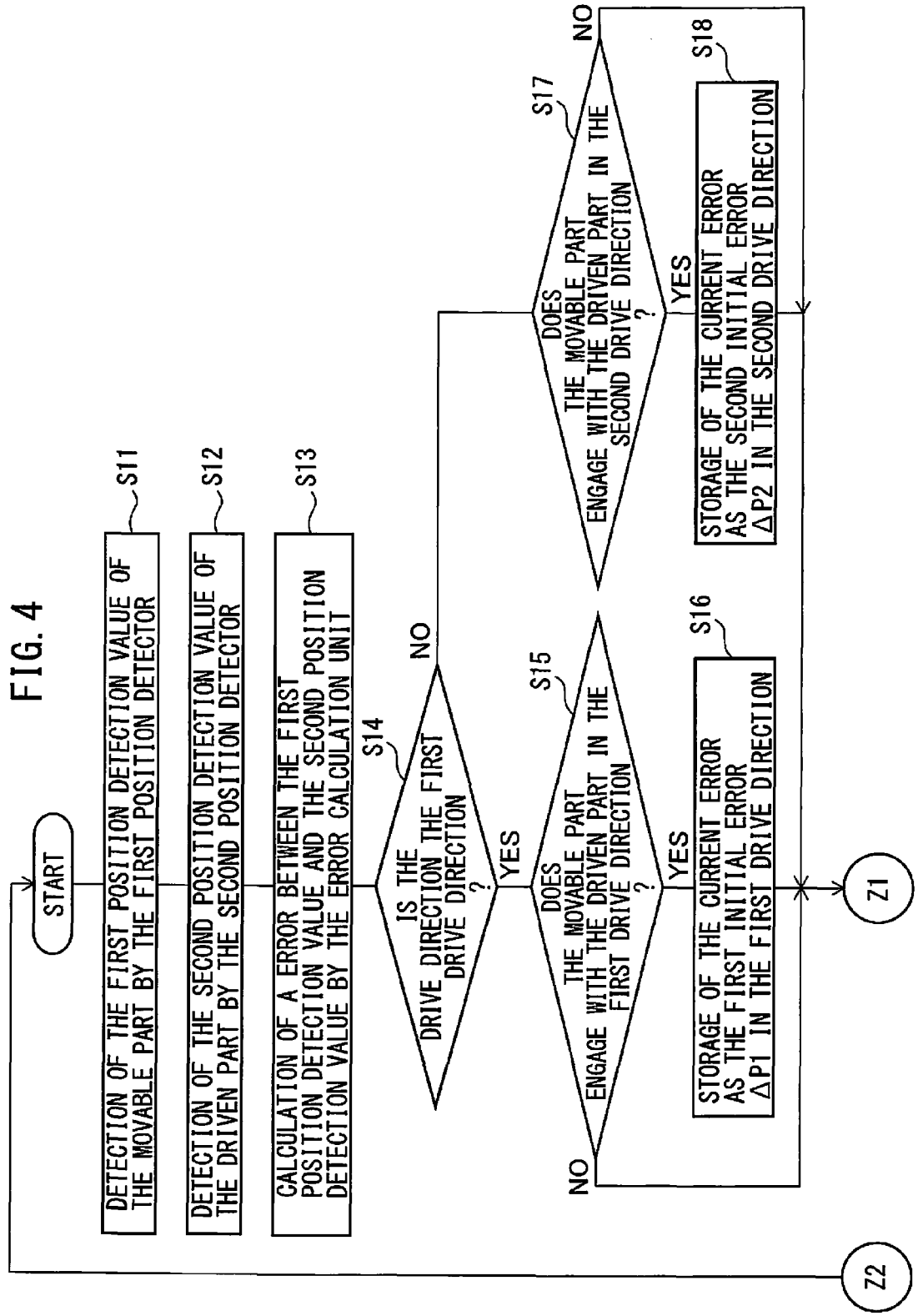
FIG. 4 is a flow chart showing part of the operations of a motor control apparatus according to the present invention.
Figure 5:
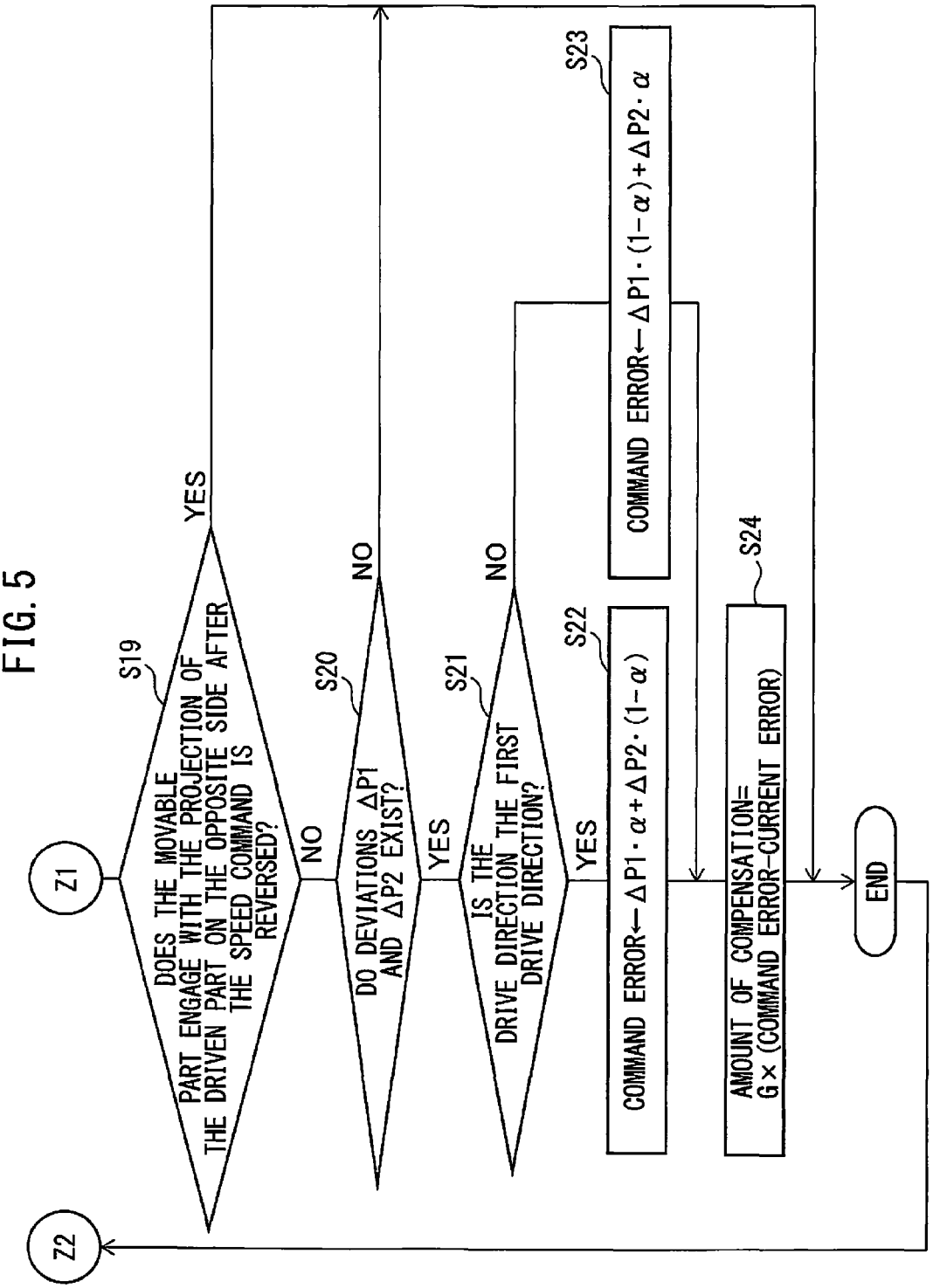
FIG. 5 is a flow chart showing the remaining operation of a motor control apparatus according to the present invention.

FIGS. 4 and 5 show flow charts of the operation of the motor control apparatus according to the present invention. The operations shown in FIGS. 4 and 5 are repeated at a predetermined control cycle. The operation of the motor control of the present invention will be described below with reference to FIGS. 1 to 5.

First, the position command preparation unit 20 prepares the position command CP. At steps S11 and S12 in FIG. 4, the first position detector 11 and the second position detector 12 detect the first position detection value DP1 of the movable part WA and the second position detection value DP2 of the driven part WB, respectively.

Thereafter, as shown in FIG. 4, at step S13, the deviation calculation unit 31 calculates a deviation ΔP between the first position detection value DP1 and the second position detection value DP2. The deviation ΔP is successively stored in the storage unit 33. The stored deviations ΔP are correlated with the drive direction.

Then, at step S14, whether the drive direction is the first drive direction or not is checked. In this specification, the right direction and the left direction in FIG. 2, etc., are the first drive direction and the second drive direction, respectively. The drive direction can be easily understood from the sign (plus or minus) of the difference of the position command outputted from the position command preparation unit 20.

If it is judged that the drive direction is the first drive direction, the control proceeds to step S15. At step S15, the judgment unit 32 checks whether the projection A1 of the movable part WA engages with the driven part WB in the first drive direction. If the projection A1 of the movable part WA engages with the driven part WB, the current deviation ΔP is stored as the first initial deviation ΔP1 together with the drive direction in the storage unit 33 at step S16.

For example, the judgment unit 32 judges that the projection A1 of the movable part WA has engaged with the driven part WB when the table 54 is moved at a constant speed or is accelerated in the first drive direction after a predetermined time has elapsed from the commencement of the operation of the motor M. Consequently, the first initial deviation ΔP1 includes elastic deformations of the first elastically deformable member 61 and the second elastically deformable member 62 in the first drive direction. As a matter of course, it is possible to judge that the projection A1 of the movable part WA has engaged with the driven part WB by other methods.

If it is judged at step S14 that the drive direction is the second drive direction, the control proceeds to step S17. At step S17, the judgment unit 32 checks whether the projection A2 of the movable part WA engages with the driven part WB in the second drive direction. The judgment is performed substantially in the same manner as described above. If the projection A2 of the movable part WA engages with the driven part WB, the current deviation ΔP is stored as the second initial deviation ΔP2, together with the drive direction in the storage unit 33 at step S18. As described above, the second initial deviation ΔP2 includes elastic deformations of the first elastically deformable member 61 and the second elastically deformable member 62 in the second drive direction.

At step S19, whether the movable part WA engages with the other projection of the driven part WB on the opposite side after the speed command has been inverted is checked. If the movable part WA engages with the other projection of the driven part WB on the opposite side, no compensation is necessary, and accordingly, the process ends.

At step S20, whether both the first and second deviations ΔP1 and ΔP2 are stored in the storage unit 33 is checked. If one or both of the first and second initial deviations ΔP1 and ΔP2 are not stored, it is not possible to calculate a command deviation which will be described hereinafter. Therefore, the process ends.

If both the first and second deviations ΔP1 and ΔP2 are stored in the storage unit 33, the control proceeds to step S21 at which whether the drive direction is the first drive direction is checked. If the drive direction is the first drive direction, the control proceeds to step S22. At step S22, the compensation calculation unit 34 calculates a command deviation based on the following formula (1):

$$\text{command deviation} \leftarrow \Delta P1 \cdot \alpha + \Delta P2 \cdot (1-\alpha) \quad (1)$$

In the formula (1) and formula (2) which will be described hereinafter, α is a constant larger than 0 but not more than 1. The constant α can be experimentally determined by an operator and is preferably stored in the storage unit 33. It should be noted that the calculated command deviation is temporarily stored in the compensation calculation unit 34.

If the drive direction is the second drive direction, the control proceeds to step S23. At step S23, the compensation calculation unit 34 calculates a command deviation based on the following formula (2):

$$\text{command deviation} \leftarrow \Delta P1 \cdot (1-\alpha) + \Delta P2 \cdot \alpha \quad (2)$$

Then, at step S24, the compensation calculation unit 34 calculates the amount of compensation based on the following formula (3):

$$\text{amount of compensation} = G \times (\text{command deviation} - \text{current deviation}) \quad (3)$$

In the formula (3), G represents a gain and the current deviation means the latest deviation calculated at step S13. The processes shown in FIGS. 4 and 5 are repeated at a predetermined control cycle.

Again, with reference to FIG. 1, the first position detection value DP1 detected by the first position detector 11 is subtracted from the position command CP prepared by the position command preparation unit 20 by a subtracter 21. The amount of compensation prepared by the compensation calculation unit 34 is added to the position command CP by an adder 22 and is input to the speed command preparation unit 24. The speed command preparation unit 24 prepares a speed command value CV.

Furthermore, the speed detection value DV detected by the first position detector 11 is subtracted from the speed command value CV by the subtracter 25 and is input to the torque command preparation unit 26. The torque command value prepared by the torque command preparation unit 26 is input to the motor M to drive the motor M.

Figure 6:
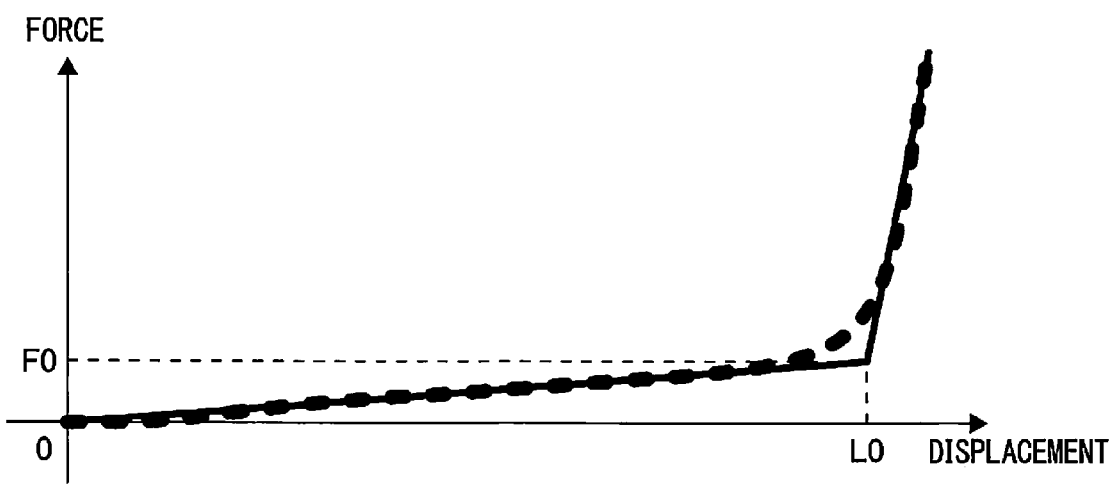
FIG. 6 is a graph showing the relationship between the displacement of springs corresponding to a first elastic deformation part and a second elastic deformation part and a force.

FIG. 6 shows a relationship between the displacement of a spring and a force. The spring corresponds to the first elastically deformable member 61 and the second elastically deformable member 62. As may be seen in FIG. 6, it is assumed that the spring corresponding to the first and second elastically deformable members 61 and 62 consists of two spring elements having different spring constants, connected to each other in series. In other words, the displacement is relatively large when the force is between zero and F0, but exhibits a slight change when the force exceeds F0.

In the prior art, the amount of compensation was calculated by subtracting the current deviation from the stored initial deviation. For example, in FIG. 6, when the force at which the initial deviation has been stored is greater than F0, the displacement is slightly larger than L0. When the force applied after reversing is smaller than F0, the actual displacement should be considerably smaller than L0. However, in this case, as the amount of compensation which was calculated based on the displacement which is slightly larger than L0 is used, the amount of compensation becomes excessive, thus resulting in the possibility of occurrence of over milling in the workpiece.

Figure 7:
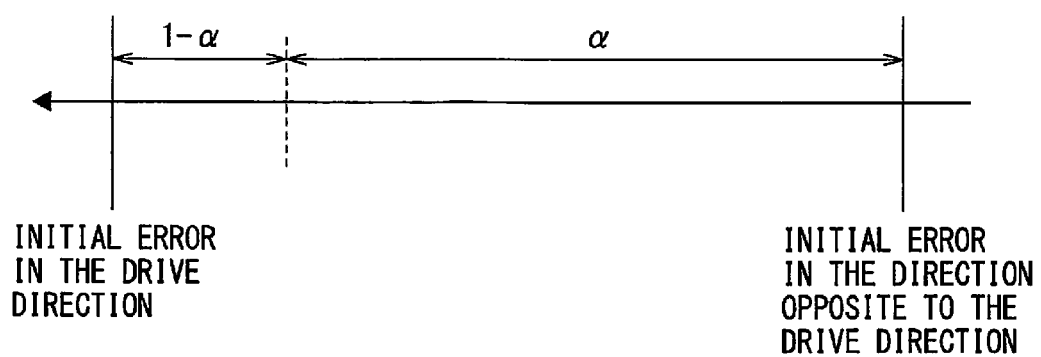
FIG. 7 is a schematic view of a command deviation.
Figure 8A:
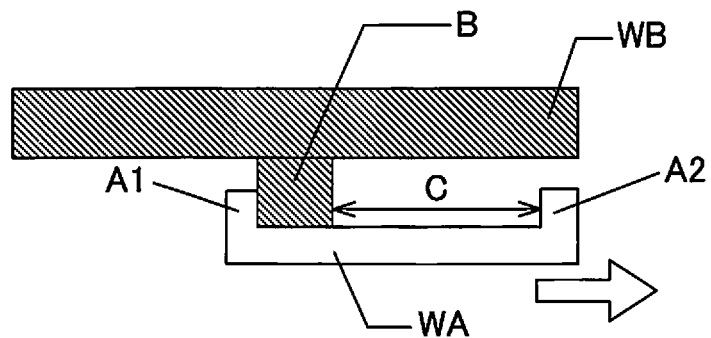
FIG. 8A is a first explanatory view of backlash.
Figure 8B:
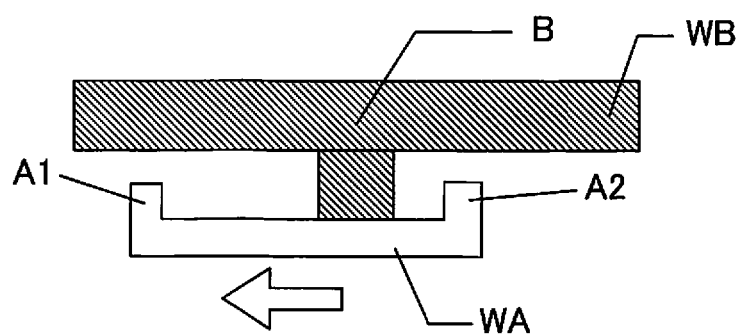
FIG. 8B is a second explanatory view of backlash.
Figure 8C:
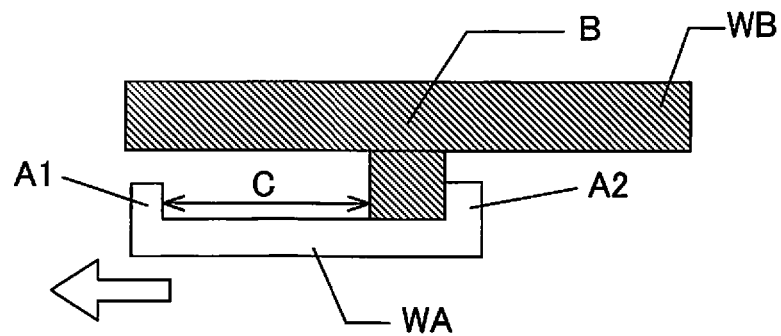
FIG. 8C is a third explanatory view of backlash.

In contrast thereto, in the present invention, the command deviation is calculated based on the first initial deviation $\Delta P1$, the second initial deviation $\Delta P2$, and the predetermined constant $\alpha$, using the formulae (1) and (2) explained in steps S22 and 23. In addition, using the formula (3), the current deviation is subtracted from the command deviation to obtain the amount of compensation. As can be seen in FIG. 7 which schematically shows the command deviation, the command deviation corresponds to an internally dividing point at which the sum of the initial deviation $\Delta P1$ in the first direction and the initial deviation $\Delta P2$ in the second direction is divided into $\alpha$: $(1-\alpha)$.

In this case, as the elastic deformations of the first elastically deformable member 61 and the second elastically deformable member 62 are taken into account, it is possible to prevent the amount of compensation from becoming excessive. Therefore, in the present invention, the workpiece cannot be cut excessively, whereby over milling is not formed in the surface of the workpiece. Consequently, it is possible to lower the possibility that the workpiece will be judged to be defective.

Moreover, it is preferable that the constant $\alpha$ be a value between 0.75 and 0.95. In this case, it is possible to further lower the possibility that a workpiece will be judged to be defective. When the constant $\alpha$ is 0.75 or its approximation, it is possible to greatly reduce the possibility of over millings being formed in the surfaces of the workpieces.

EFFECTS OF THE INVENTION

According to the first and second embodiments of the invention, the amount of compensation is calculated by subtracting the current deviation from the command deviation calculated based on the first initial deviation, the second initial deviation, and the predetermined constant. In this case, since the elastic deformation is taken into consideration, no excessive amount of compensation occurs. Therefore, the workpiece cannot be cut excessively and accordingly, over millings are not formed in the surface of the workpiece. Thus, the possibility that the workpiece will be judged to be defective can be decreased.

According to the third embodiment, the possibility that the workpiece will be judged to be defective can be further decreased.

Although the present invention has been described above with reference to representative embodiments, it may be understood that the aforementioned modifications, further various modifications, deletion or addition can be performed by a person skilled in the relevant art, without departing from the scope of the invention.

What is claimed is:

1. A motor control apparatus having a movable part which is driven by a motor and a driven part which is driven by the movable part, comprising
    a first position detector which detects the position of the movable part,
    a second position detector which detects the position of the driven part,
    an error calculation unit which calculates an error between a first position detection value detected by the first position detector and a second position detection value detected by the second position detector,
    a storage unit which stores the errors calculated by the error calculation unit when the movable part engages with the driven part in a first drive direction and in a second drive direction opposite to the first drive direction, as a first initial error and a second initial error, respectively, and
    a compensation calculation unit which calculates the amount of compensation to compensate backlash between the movable part and the driven part and an elastic deformation caused by the engagement of the movable part with the driven part,
    wherein the compensation calculation unit calculates a compensation based on the first initial error and the second initial error stored by the storage unit and a predetermined constant which is larger than 0 and not greater than 1 and calculates the amount of compensation by subtracting the current error calculated by the error calculation unit from the initial error,
    wherein when the drive direction after reversing the motor is the first drive direction, the compensation is represented by $\Delta P1 \cdot \alpha + \Delta P2 \cdot (1-\alpha)$, wherein when the drive direction after reversing the motor is the second drive direction, the compensation is represented by $$\Delta P1 \cdot (1-\alpha) + \Delta P2 \cdot \alpha, \quad (5)$$

wherein $\Delta P1$ is the first initial error, $\Delta P2$ is the second initial error, and $\alpha$ is the constant.

2. A motor control apparatus according to claim 1, wherein the constant is a value between 0.75 and 0.95.

\* \* \* \* \*